(12) United States Patent
Yeh et al.

(10) Patent No.: US 7,602,971 B2
(45) Date of Patent: Oct. 13, 2009

(54) SYSTEM, METHOD AND RECORDING MEDIUM FOR AUTOMATICALLY CLASSIFYING DOCUMENTS

(75) Inventors: Chi-Ping Yeh, Taipei (TW);
Chih-Tsung Chiang, Taipei (TW);
Chih-Yao Chang, Taipei (TW)

(73) Assignee: Newsoft Technology Corporation, Taipei (TW)

( * ) Notice: Subject to any disclaimer, the term of this patent is extended or adjusted under 35 U.S.C. 154(b) by 662 days.

(21) Appl. No.: 11/295,455

(22) Filed: Dec. 7, 2005

(65) Prior Publication Data

US 2006/0251326 A1 Nov. 9, 2006

(30) Foreign Application Priority Data

May 4, 2005 (TW) .............................. 94114411 A (51) Int. Cl.
*G06K 9/34* (2006.01)
*G06K 9/62* (2006.01)
(52) U.S. Cl. ........................................ 382/176; 382/224
(58) Field of Classification Search ................. 382/173, 382/176, 218, 22, 289, 294, 296, 305, 312; 707/2–3, 7, 100, 200
See application file for complete search history.

(56) References Cited

U.S. PATENT DOCUMENTS

| | | | | |
|---|---|---|---|---|
| 5,848,407 A | * | 12/1998 | Ishikawa et al. | 702/2 |
| 5,867,597 A | * | 2/1999 | Peairs et al. | 382/209 |
| 6,178,417 B1 | * | 1/2001 | Syeda-Mahmood | 707/3 |
| 2003/0126147 A1 | * | 7/2003 | Essafi et al. | 707/100 |
| 2004/0088332 A1 | * | 5/2004 | Lee et al. | 707/200 |
| 2006/0095432 A1 | * | 5/2006 | Iwasaki | 707/7 |

* cited by examiner

*Primary Examiner*—Kanji Patel
(74) *Attorney, Agent, or Firm*—Birch, Stewart, Kolasch & Birch, LLP (57) ABSTRACT

A system for automatically classifying documents includes a database, a positioning-information capturing device, a locating device, and a document comparison device. The database is used for storing a reference document. The positioning-information capturing device is used for capturing the positioning information of a plurality of objects in a digitized document. The locating device is used for capturing the corresponding objects of the reference document according to the positioning information of the objects. The document comparison device then proceeds with an orientation process and determines whether the digitized document and the reference document are of the same classification according to the distances between all of the objects of the digitized document and the nearest objects thereto in the reference document. A method and a computer readable recording medium for automatically classifying documents are also disclosed.

27 Claims, 7 Drawing Sheets

SYSTEM, METHOD AND RECORDING MEDIUM FOR AUTOMATICALLY CLASSIFYING DOCUMENTS

BACKGROUND OF THE INVENTION a) Field of the Invention

The invention relates to a system, a method and a recording medium for automatically classifying documents, and more particularly, to a system, a method and a recording medium for automatically classifying documents having a plurality of objects.

b) Description of the Related Art

With the technology advancement in recent years, lots of information is able to be digitally stored and document digitization is just one of the examples. Digitization of documents can effectively reduce the space required for storing documents and the digitized documents are easy to query and manage. However, an operating company generates a large quantity of documents of different types, such as financial, personnel, research, quality assurance and more, which all must be managed, and managing these complex types of documents causes another form of management overhead.

Classifying documents is an important step in document management because it can help narrow the search range and thus enhances management efficiency. In the past, a method called Optical Character Recognition (OCR) is used to automatically classify documents, but OCR requires more processes and operations, which in turn requires better hardware equipment and uses a lot of recourses. Therefore, unless the documents need to be classified down to the content written therein, otherwise it is best to avoid using OCR for automatic document classification.

Another method for automatically classifying documents is by imitating the mode of human vision to capture important characteristics of documents for determining whether the two documents are the same. For example, the table format in a document is used as a template for selecting and capturing characteristics; the characteristics mean, in general, straight lines or columns outlined by the straight lines in the table. However, during the input stage of digitization process, paper documents are more or less tilted, displaced, or scaled due to different resolutions, and these problems interfere the automatic classification of documents. Although relative information such as vectors, angle of tilt, and slope can be obtained to eliminate the aforementioned interferences, the aforementioned method still requires a lot of operations and uses hardware resources.

Therefore, how to eliminate the aforementioned factors that interfere automatic classification of documents and how to effectively classify digitized documents using relatively smaller hardware requirement are the goals to be achieved.

BRIEF SUMMARY OF THE INVENTION

In view of the above problems, an object of the invention is to provide a system and a method for automatically classifying documents and a recording medium thereof that eliminate classification-interfering factors generated during digitization of documents, so that digitized documents can be classified effectively by using relatively smaller hardware requirement; the factors include tilting, displacement, and scaling.

To achieve the aforementioned object, a system for automatically classifying documents of the invention includes a database, a positioning-information capturing device, a locating device, and a document comparison device. The database is used for storing at least one reference document. The positioning-information capturing device is used for capturing the positioning information of a plurality of objects of a digitized document. The locating device is used for comparing the positioning information of the plurality of objects with the positioning information of objects of the reference document to capture corresponding objects in the reference document. The document comparison device is used for comparing the plurality of objects with the corresponding objects in the reference document for proceeding an orientation process so that the plurality of objects overlap the corresponding objects in the reference document, and then determining whether the digitized document and the reference document are of the same classification according to the distances between all of the objects of the digitized document and the nearest objects thereto in the reference document.

The invention also discloses a method for automatically classifying documents, wherein the steps include capturing the positioning information of a plurality of objects of a digitized document; comparing the positioning information of the plurality of objects with the positioning information of objects of a reference document stored in a database for capturing corresponding objects in the reference document; and comparing the plurality of objects with the corresponding objects in the reference document for proceeding an orientation process so that the plurality of objects overlap the corresponding objects in the document, and then determining whether the digitized document and the reference document are of the same classification according to the distances between all of the objects of the digitized document and the nearest objects thereto in the reference document.

According to the system and method for automatically classifying documents of the invention, the interfering factors generated during the process of document digitization, such as tilting, displacement, and scaling, can be eliminated via simple operations, and so the digitized documents can be effectively and automatically classified with relatively smaller hardware requirement.

DETAILED DESCRIPTION OF THE INVENTION

The system and method for automatically classifying documents according to a preferred embodiment of the invention will be described below with reference to the drawings, wherein the like reference numerals denote the like components.

Figure 1:
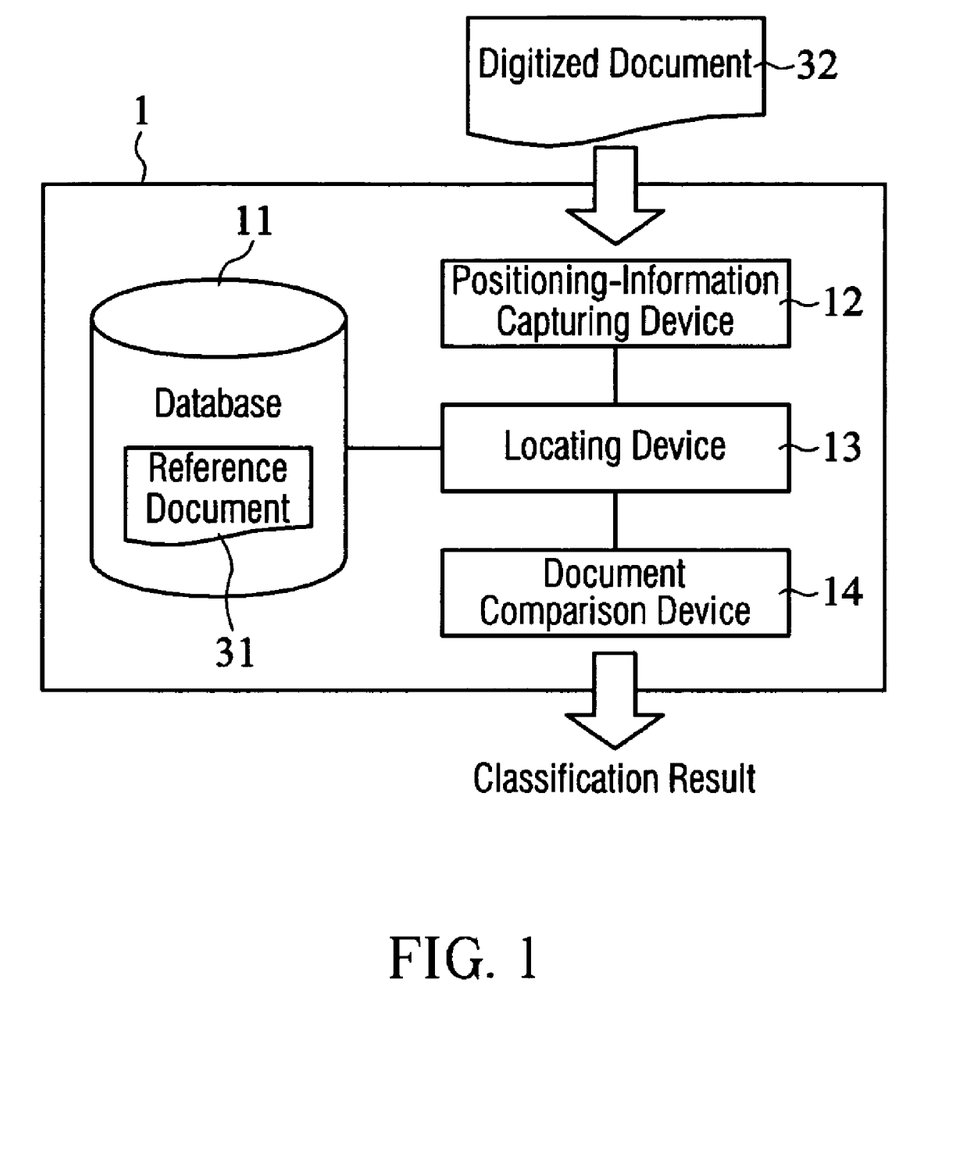
FIG. 1 is a block diagram illustrating a system for automatically classifying documents according to a preferred embodiment of the invention

Referring to FIG. 1, a system 1 for automatically classifying documents according to a preferred embodiment of the invention is used to classify a digitized document 32, and the system 1 includes a database 11, a positioning-information capturing device 12, a locating device 13, and a document comparison device 14.

Figure 2:
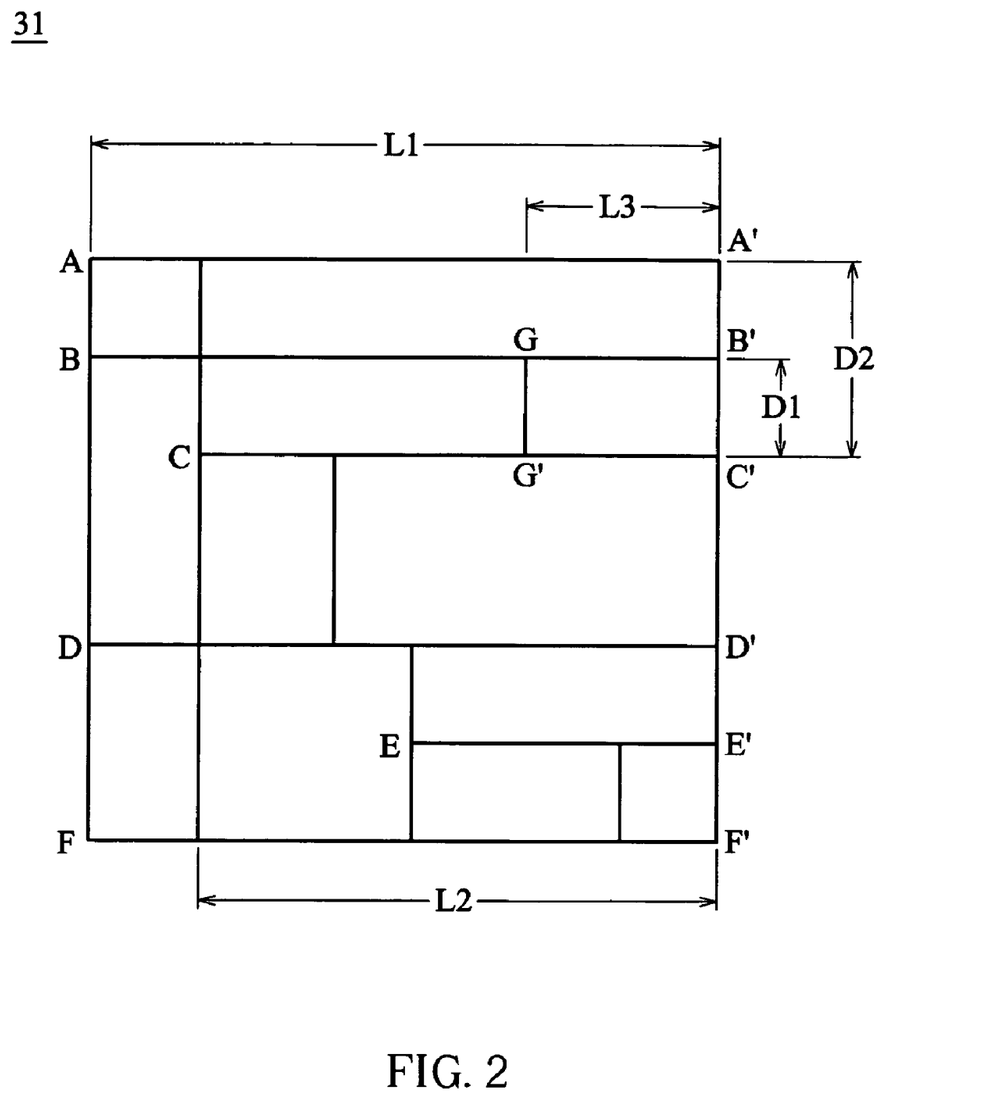
FIG. 2 is a schematic diagram of a reference document

At least one reference document 31 is stored in the database 11. A document containing tables is used for illustrating the details of the invention. FIG. 2 illustrates a reference document 31, and the positioning information of the reference document 31 includes the end point coordinates of the straight lines of the tables, the ratio of the distance between any two straight lines to the length of one of the two straight lines, and the ratio of the projection length of one straight line on another straight line to the length of one of the two straight lines. For example, the end point coordinates of the straight line AA'; the ratio (D1/L1) of the distance D1 between the straight line BB' and the straight line CC' to the length L1 of the straight line BB'; the ratio (D1/L2) of the distance D1 to the length L2 of the straight line CC'; the ratio (D2/L1) of the distance D2 between the straight line AA' and the straight line CC' to the length L1 of the straight line AA'; the ratio (L2/L1) of the projection length L2 of the straight line CC' on the straight line BB' to the length L1 of the straight line BB', and etc.

Figure 3:
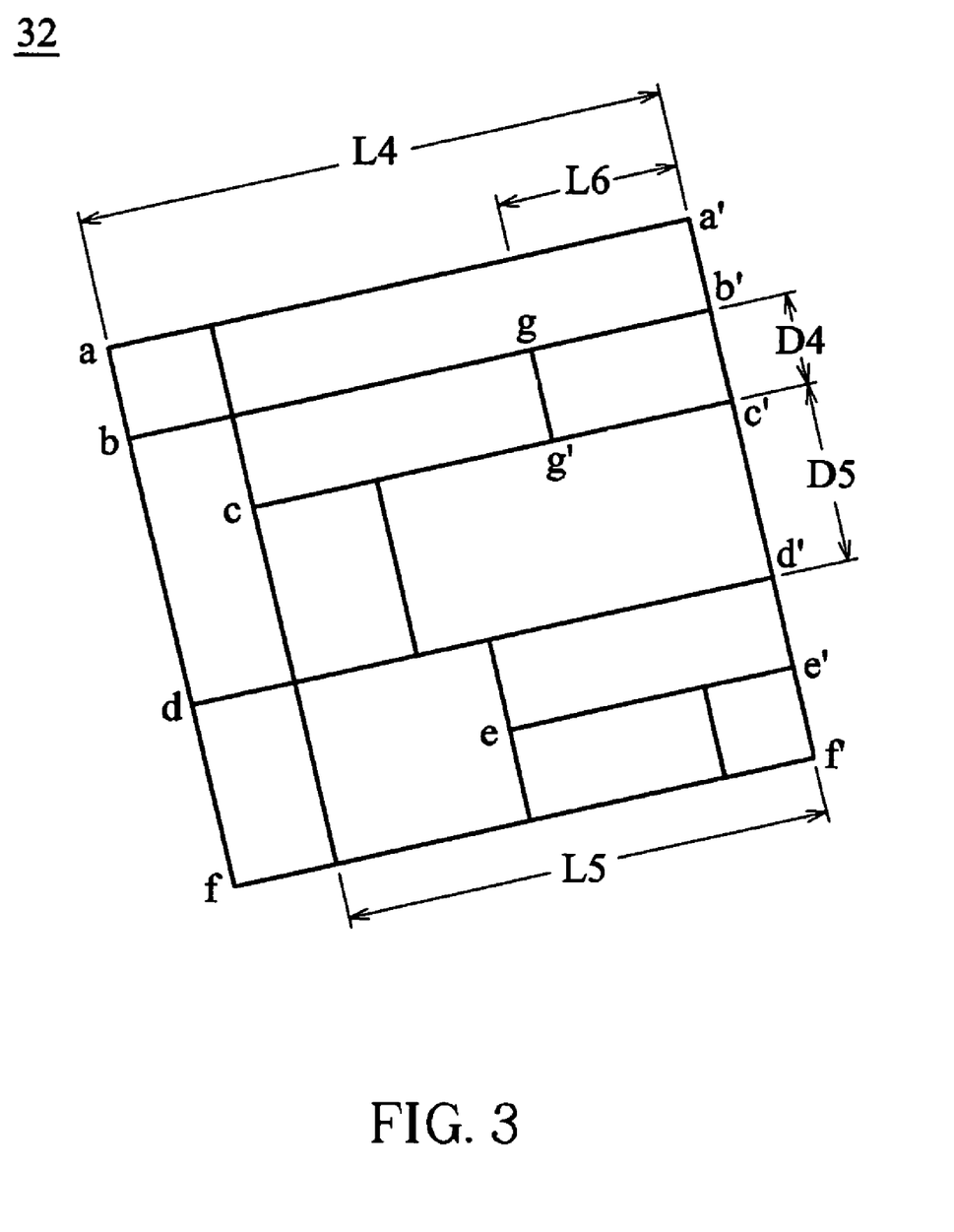
FIG. 3 is a schematic diagram of a digitized document

The positioning-information capturing device 12 captures the positioning information of a plurality of straight lines of the digitized document 32. Referring to FIG. 3, after the positioning-information capturing device 12 captures the end point coordinates of the straight lines bb', cc' and dd' of the digitized document 32, the ratio (D4/L4) of the distance D4 between the straight lines bb' and cc' to the length L4 of the straight line bb', the ratio (D5/L5) of the distance D5 between the straight lines cc' and dd' to the length L5 of the straight line cc', and the ratio (L5/L4) of the projection length L5 of the straight line cc' on the straight line bb' to the length L4 of the straight line bb' can be obtained by calculation.

The locating device 13 compares the positioning information of the plurality of straight lines of the digitized document 32 with the positioning information of the corresponding straight lines in the reference document 31. For example, dynamic programming algorithm can be used to find that the straight lines BB', CC' and DD' in the reference document 31 correspond to the straight lines bb', cc' and dd' of the digitized document 32, respectively.

The document comparison device 14 compares the positioning information of the plurality of straight lines of the digitized document 32 with the reference document 31 to proceed with an orientation process such that the plurality of straight lines of the digitized document 32 overlap the corresponding straight lines in the reference document 31. The orientation process includes at least one of rotational treatment, displacement treatment, or scaling treatment.

The rotational treatment uses the angle between a horizontal line and the plurality of straight lines of the digitized document 32 to obtain the tilt degree of the digitized document 32, and so the plurality of straight lines of the digitized document 32 can overlap the corresponding straight lines in the reference document 31 after compensation. The displacement treatment uses the end point coordinates of the plurality of straight lines of the digitized documents 32 and the corresponding straight lines in the reference documents 31 to obtain horizontal and vertical displacement quantities of the digitized document 32, and so the plurality of straight lines of the digitized document 32 can overlap the corresponding straight lines in the reference document 31 after compensation. The scaling treatment keeps the ratio of the distance between any two straight lines in the plurality of straight lines of the digitized document 32 to the length of one of the two straight lines unchanged, or the ratio of the projection length of one straight line on another straight line to the length of one of the two straight lines unchanged to scale the digitized document 32, and so the plurality of straight lines of the digitized document 32 can overlap the corresponding straight lines in the reference document 31. For example, the digitized document 32 is scaled under the condition that the ratio (D4/L4) of the distance D4 between the straight lines bb' and cc' to the length L4 of the straight line bb' is kept unchanged, so that the length L4 of the straight line bb' equals the length L1 of the straight line BB' in the reference document 31. In this way, the digitized document 32 is scaled to the same size as the reference document 31.

The document comparison device 14 then determines whether the digitized document 32 and the reference document 31 are of the same classification according to the distances between all of the straight lines of the digitized document 32 and the nearest straight lines thereto in the reference document 31. The method of determination is by comparing the digitized document 32 with the reference document 31 stored in the database; when the sum of the distances between all of the straight lines of the digitized document 32 and the nearest straight lines thereto in the reference document 31 is the smallest, the digitized document 32 is determined to be of the same classification as the reference document 31.

Referring to FIGS. 2 to 5, a document containing tables is used to illustrate the system for automatically classifying documents according to a preferred embodiment of the invention. Partial positioning information of the reference document 31 is as shown in FIG. 2 and partial positioning information of the digitized document 32 is as shown in FIG. 3, wherein the table in the digitized document 32 has been tilted, displaced, and scaled because of the unstableness of digitization process.

First, the positioning-information capturing device 12 captures the characteristics of the plurality of straight lines of the digitized document 32 such as the end point coordinates of the straight lines bb' and cc' and calculates the lengths L4, L5 of the straight lines bb' and cc' and the distance D4 thereinbetween. Although the digitized document 32 has been scaled, the relative relationship between the straight lines bb' and cc' is not affected thereby. For example, the ratio (D4/L4) of the distance D4 between the straight lines bb' and cc' to the length L4 of the straight line bb' is unchanged, and so is the ratio (L4/L5) of the length L4 of the straight line bb' to the length L5 of the straight line cc'. Therefore, the locating device 13 can use dynamic programming algorithm to find the straight lines in the reference document 31 that correspond to straight lines bb' and cc' according to the aforementioned positioning information, namely, the straight lines BB' and CC'.

Figure 4:
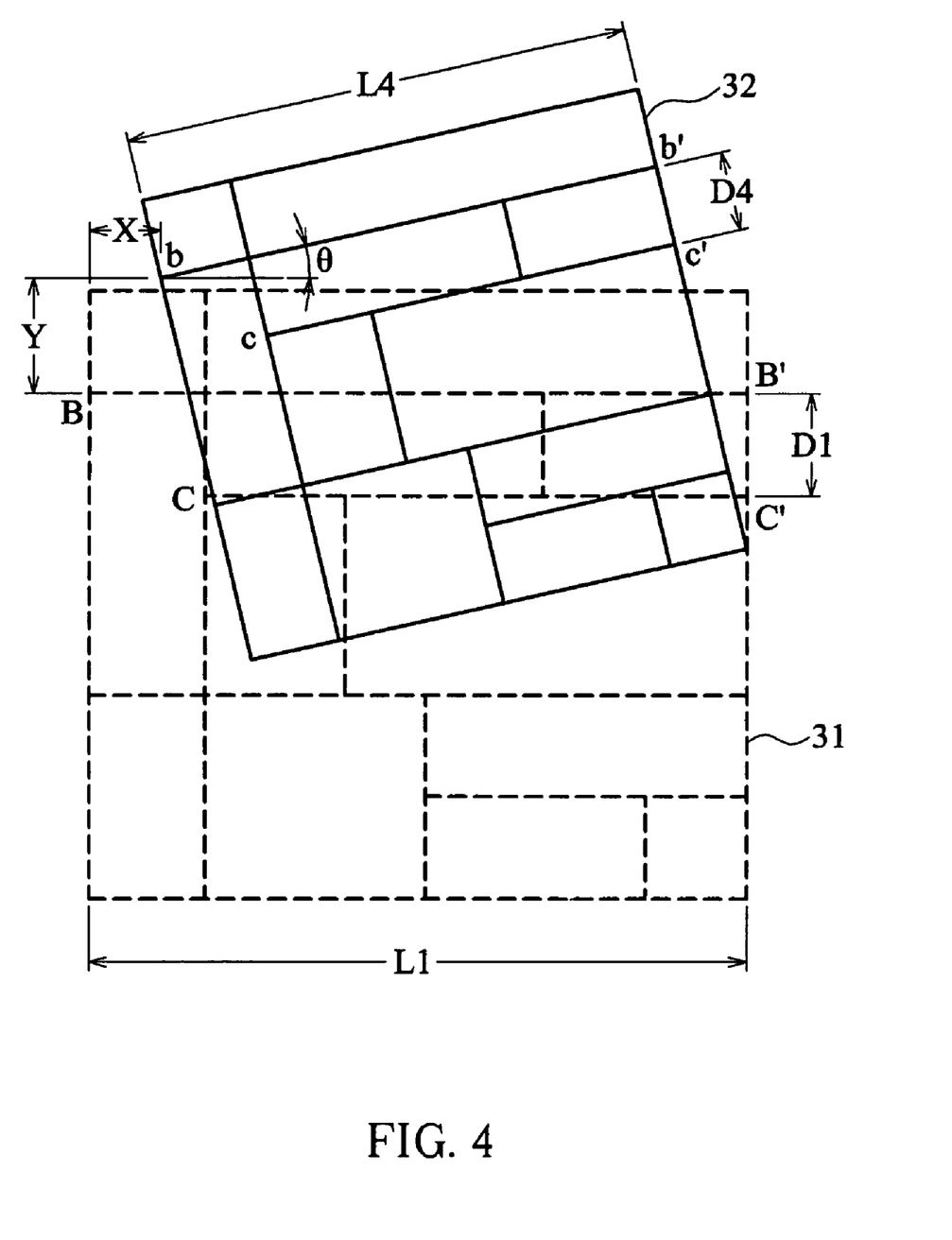
FIG. 4 is a schematic diagram illustrating a tilted, displaced, and scaled digitized document in correspondent to a reference document

Then, the tilt degree of the digitized document 32 can be obtained from the angle θ between the straight line bb' and a horizontal line and so the position of the digitized document 32 can be compensated by rotation. From the end point coordinates of point B of the straight line BB' and point b of the straight line bb', the horizontal and vertical displacement quantities are obtained as X and Y respectively, and therefore the straight line bb' can overlap the straight line BB' after compensation. As aforementioned, the ratio (D4/L4) of the distance D4 between the straight lines bb' and cc' to the length L4 of the straight line bb' is not affected by the scaling of the digitized document 32. Thus, by keeping the ratio (D4/L4) unchanged and scaling the digitized document 32 such that the length L4 of the straight line bb' is the same as the length L1 of the straight line BB', the straight lines bb' and cc' can overlap the straight lines BB' and CC', respectively.

Figure 5:
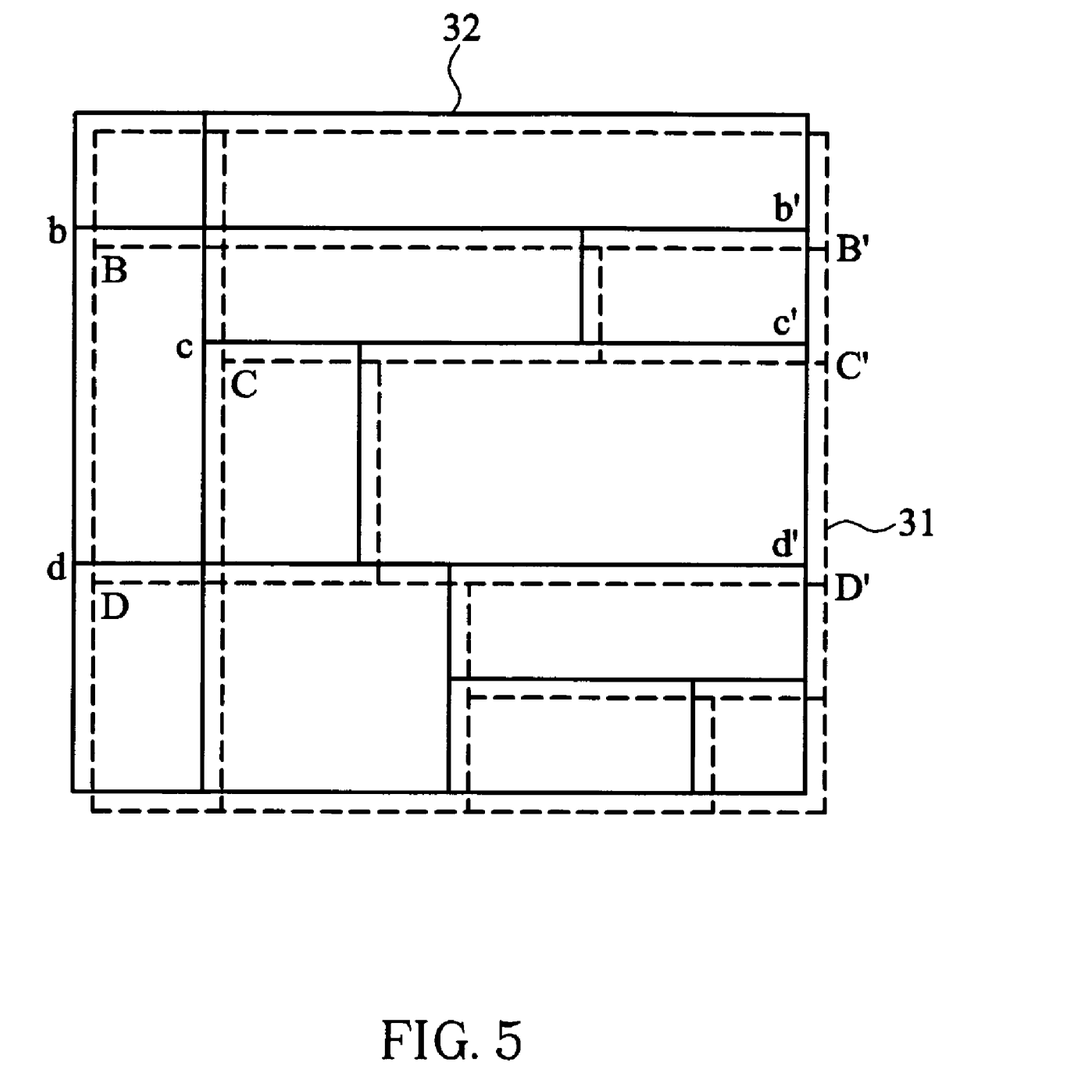
FIG. 5 is a schematic diagram illustrating the comparison of a reference document and a digitized document after an orientation process
Figure 6:
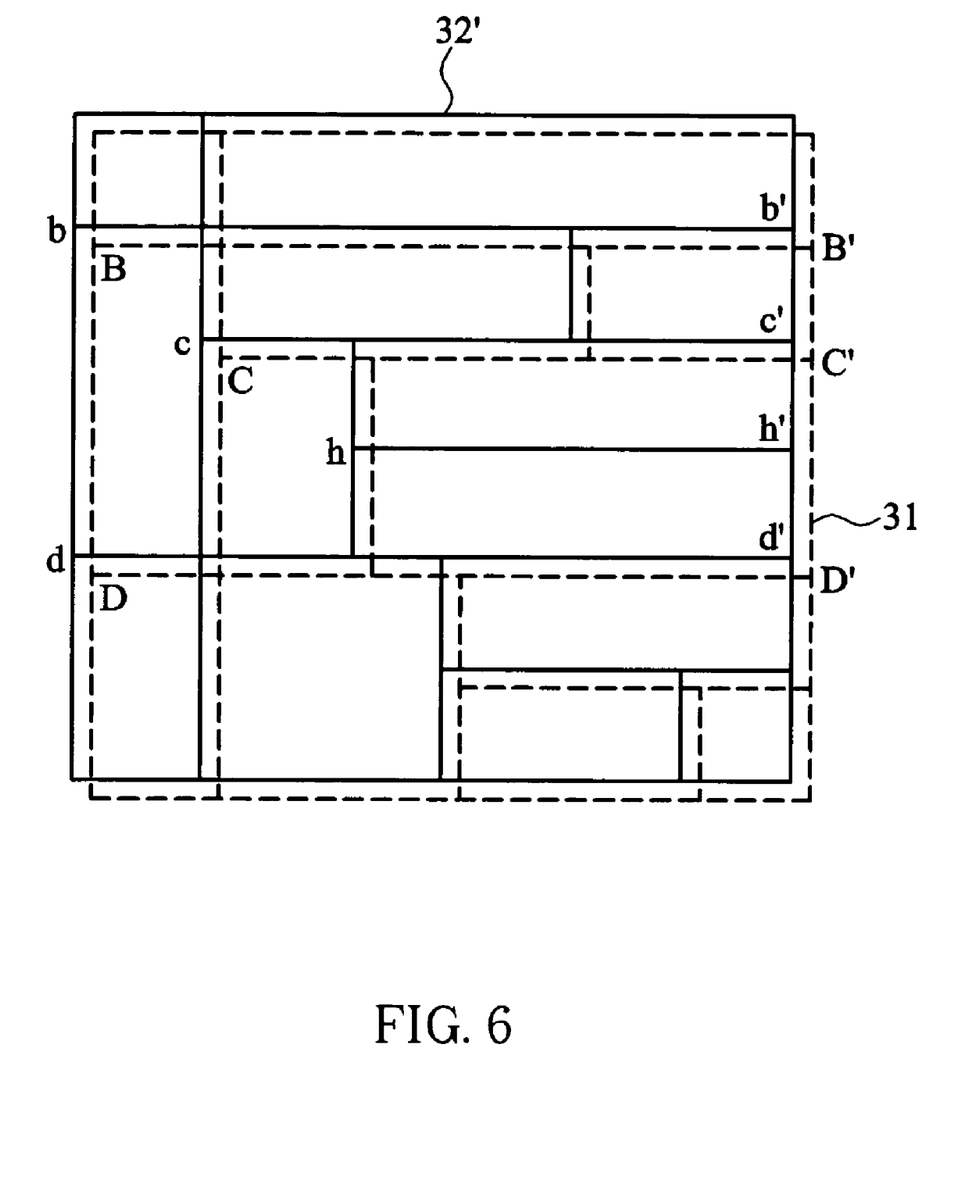
FIG. 6 is schematic diagram illustrating another comparison of a reference document and a digitized document after an orientation process

After the orientation process, the digitized document 32 can be compared with the reference document 31. The digitized document 32 illustrated in FIG. 5 is a little bit displaced from the reference document 31 for explanation purpose; please ignore the displacement. As shown in FIG. 5, the document comparison device 14 computes the distances between all of the straight lines of the digitized document 32 and the nearest straight lines thereto in the reference document 31, and when the sum of these distances is the smallest, the digitized document 32 is determined to be of the same classification as the reference document 31. The document comparison device 14 then outputs the classification result. Accordingly, if the table in a digitized document 32' contains a straight line hh' as shown in FIG. 6, the straight line in the reference document 31 that is the nearest to the straight line hh' is the straight line CC' or the straight line DD', thereby the sum of the distances obtained after comparing the digitized document 32' with the reference document 31 would greatly increase, and thus the digitized document 32' is not of the same classification as the reference document 31.

It is to be noted that two horizontal lines are captured and compared in the previous descriptions. To increase the accuracy of automatic classification, a plurality of straight lines of the digitized document 32, such as the straight lines aa', bb', cc', dd', ee', and ff', can be captured at the same time and be orientated with respect to the straight lines AA', BB', CC', DD', EE', and FF' in the reference document 31. However, this may increase the computation load. Moreover, the vertical straight line gg' can also be captured and compared with the straight line GG' in the reference document 31. As well, the size of columns in the table can be used as a basis for scaling the digitized document 32, for example, the ratio (L4/L6) of the length L4 of the straight line bb' to the length L6 of the straight line gb' is the same as the ratio (L1/L3) of the length L1 of the straight line BB' to the length L3 of the straight line GB'.

Figure 7:
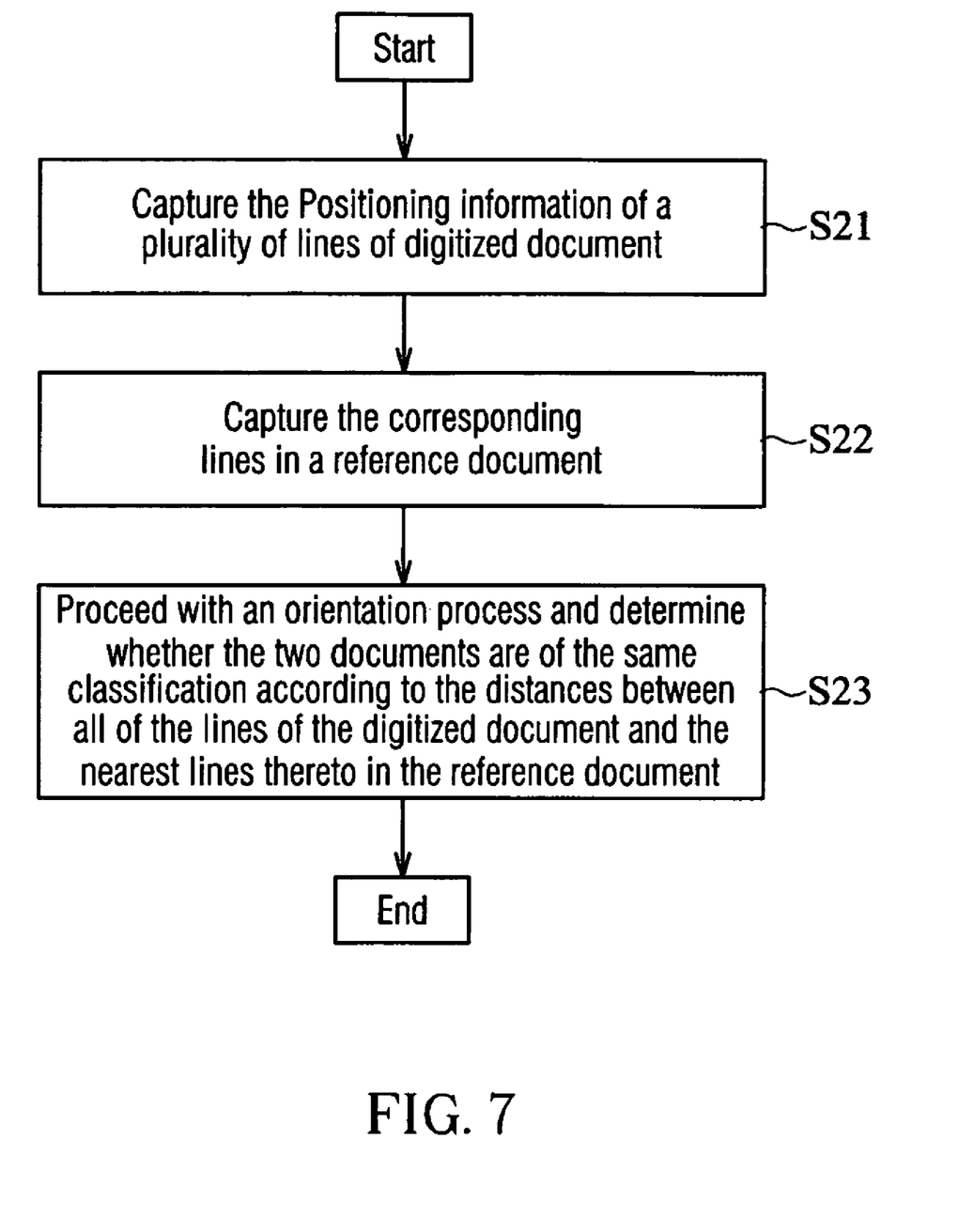
FIG. 7 is a flow chart illustrating a method for automatically classifying documents according to a preferred embodiment of the invention.

Referring to FIG. 7, the invention discloses a method for automatically classifying documents, which includes steps of capturing the positioning information of a plurality of straight lines of a digitized document 32 (S21); comparing the captured positioning information of the plurality of straight lines with the positioning information of straight lines of a reference document 31 stored in a database 11 for capturing the corresponding straight lines in the reference document 31 (S22); and comparing the plurality of straight lines of the digitized document 32 to the corresponding straight lines in the reference document 31 for proceeding with an orientation process so that the plurality of straight lines captured overlap the corresponding straight lines in the reference document 31, and determining whether the digitized document 32 is of the same classification as the reference document 31 according to the distances between all the straight lines of the digitized document 32 and the nearest straight lines thereto in the reference document 31 (S23). The details on the positioning-information capturing, the orientating, and the document comparing have been described before and are, hence, not further described hereinafter.

The system and method for automatically classifying documents according to the invention can eliminate the interfering factors, such as tilting, displacement, and scaling that are generated during document digitization, without using OCR, rather, simple calculations are used. Therefore, the system and method for automatically classifying documents of the invention can effectively classify digitized documents automatically with relatively smaller hardware requirement.

While the invention has been described by way of example and in terms of the preferred embodiment, it is to be understood that the invention is not limited to the disclosed embodiments. In other words, it is intended to include equivalent modifications and changes of the above embodiments without departing from the spirit and scope of the invention as would be apparent to those skilled in the art. For example, a digitized document can be treated with a thinning process of image treatment before the capturing of the characteristics of a plurality of straight lines so that more precise end point coordinates of the straight lines can be obtained. Moreover, a document containing tables is used as an example in the abovementioned descriptions, but the system and method of the invention also apply to documents that contain only texts. For example, the document title, or the text description that is specific in documents of one classification can be viewed as a straight line, that is, viewing one string of continuous words in the document as one straight line, and it can be used as a basis for capturing straight-line characteristics. Furthermore, the objects in a document can be the basis for orientating the document, and the positioning information of the edges of the objects are treated with subsequent processes after being captured, for classifying the document. Therefore, the scope of the appended claims should be accorded the broadest interpretation so as to encompass all such equivalent modifications and changes.

What is claimed is:

1. A system for automatically classifying documents, in which a digitized document is classified, the system comprising:
   a database for storing at least one reference document;
   a positioning-information capturing device for capturing the positioning information of a plurality of objects of the digitized document;
   a locating device for comparing the positioning information of the plurality of objects with the positioning information of objects of the reference document to capture corresponding objects in the reference document; and
   a document comparison device for comparing the plurality of objects with the corresponding objects in the reference document to proceed with an orientation process so that the plurality of objects overlap the corresponding objects in the reference document, and for determining whether the digitized document is of the same classification as the reference document according to the distances between all of the objects of the digitized document and the nearest objects thereto in the reference document.

2. The system for automatically classifying documents as described in claim 1, wherein the positioning information includes the end point coordinates of the plurality of objects, the ratio of the distance between any two straight lines of the edges of the plurality of objects to the length of one of the two straight lines, and the ratio of the projection length of one straight line on another straight line to the length of one of the two straight lines.

3. The system for automatically classifying documents as described in claim 2, wherein the orientation process includes at least one of rotational treatment, displacement treatment, or scaling treatment.

4. The system for automatically classifying documents as described in claim 3, wherein the rotational treatment compensates the angle between a horizontal line and the plurality of objects so that the plurality of objects overlap the corresponding objects in the reference document; the displacement treatment uses the end point coordinates of the plurality of objects and the corresponding objects in the reference document to obtain horizontal and vertical displacement quantities of the digitized document and compensates the displacement so that the plurality of objects overlap the corresponding objects in the reference document; and the scaling treatment keeps the ratio of the distance between any two straight lines of the edges of the plurality of objects to the length of one of the two straight lines, or the ratio of the projection length of one straight line on another straight line to the length of one of the two straight lines unchanged, and scales accordingly so that the plurality of objects overlap the corresponding objects in the reference document.

5. The system for automatically classifying documents as described in claim 1, wherein the locating device uses dynamic programming algorithm to find the corresponding objects in the reference document.

6. The system for automatically classifying documents as described in claim 1, wherein the document comparison device compares the digitized document with the reference document stored in the database and determines the digitized document to be of the same classification as the reference document when the sum of the distances between all of the objects of the digitized document and the nearest objects thereto in the reference document is the smallest.

7. The system for automatically classifying documents as described in claim 1, wherein the object is a straight line, and the positioning-information capturing device performs a thinning process of image treatment before capturing the positioning information of a plurality of straight lines in the digitized document.

8. The system for automatically classifying documents as described in claim 7, wherein each of the digitized document and the reference document contains at least one table.

9. The system for automatically classifying documents as described in claim 1, wherein the digitized document and the reference document contain only texts, and the positioning-information capturing system captures the positioning information of a plurality of objects in the digitized document by viewing one string of continuous words as one object.

10. A method for automatically classifying documents, in which a digitized document is classified, the method comprising using a processor to perform:
   capturing the positioning information of a plurality of objects of the digitized document;
   comparing the positioning information of the plurality of objects with the positioning information of objects of a reference document stored in a database to capture corresponding objects in the reference document; and
   comparing the plurality of objects with the corresponding objects in the reference document for proceeding with an orientation process so that the plurality of objects overlap the corresponding objects in the reference document, and determining whether the digitized document is of the same classification as the reference document according to the distances between all of the objects of the digitized document and the nearest objects thereto in the reference document.

11. The method for automatically classifying documents as described in claim 10, wherein the positioning information includes the end point coordinates of the plurality of objects, the ratio of the distance between any two straight lines of the edges of the plurality of objects to the length of one of the two straight lines, and the ratio of the projection length of one straight line on another straight line to the length of one of the two straight lines.

12. The method for automatically classifying documents as described in claim 11, wherein the orientation process includes at least one of rotational treatment, displacement treatment, or scaling treatment.

13. The method for automatically classifying documents as described in claim 12, wherein the rotational treatment compensates the angle between the plurality of objects and a horizontal line so that the plurality of objects overlap the corresponding objects in the reference document; the displacement treatment uses the end point coordinates of the plurality of objects and the corresponding objects in the reference document to obtain horizontal and vertical displacement quantities of the digitized document and compensates the displacement so that the plurality of objects overlap the corresponding objects of the reference document; the scaling treatment keeps the ratio of the distance between any two straight lines of the edges of the plurality of objects to the length of one of the two straight lines, or the ratio of the projection length of one straight line on another straight line to the length of one of the two straight lines unchanged and scales accordingly so that the plurality of objects overlap the corresponding objects in the reference document.

14. The method for automatically classifying documents as described in claim 10, wherein dynamic programming algorithm is used to find the corresponding objects in the reference document.

15. The method for automatically classifying documents as described in claim 10, wherein the comparing and determining step compares the digitized document with the reference document in the database and determines the digitized document to be of the same classification as the reference document when the sum of the distances between all of the objects of the digitized document and the nearest objects thereto in the reference document is the smallest.

16. The method for automatically classifying documents as described in claim 10, wherein the object is a straight line, and the positioning-information capturing step performs a thinning process of image treatment before capturing the positioning information of a plurality of straight lines in the digitized document.

17. The method for automatically classifying documents as described in claim 16, wherein each of the digitized document and the reference document contains at least one table.

18. The method for automatically classifying documents as described in claim 10, wherein the digitized document and the reference document only contain texts, and the positioning-information capturing step captures the positioning information of a plurality of objects of the digitized document by viewing one string of continuous words as one object.

19. A computer readable recording medium for recording a method for automatically classifying documents, wherein a digitized document can be classified after the method has been read by computer, the method comprising steps of:
   capturing the positioning information of a plurality of objects in the digitized document;
   comparing the positioning information of the plurality of objects with the positioning information of objects of a reference document stored in a database to capture corresponding objects in the reference document; and
   comparing the plurality of objects to the corresponding objects in the reference document for proceeding with an orientation process so that the plurality of objects overlap the corresponding objects in the reference document, and determining whether the digitized document is of the same classification as the reference document according to the distances between all of the objects of the digitized document and the nearest objects thereto in the reference document.

20. The computer readable recording medium as described in claim 19, wherein the positioning information includes the end point coordinates of the plurality of objects, the ratio of the distance between any two straight lines of the edges of the plurality of objects to the length of one of the two straight lines, and the ratio of the projection length of one straight line on another straight line to the length of one of the two straight lines.

21. The computer readable recording medium as described in claim 20, wherein the orientation process includes at least one of rotational treatment, displacement treatment, or scaling treatment.

22. The computer readable recording medium as describe in claim 21, wherein the rotational treatment compensates the angle between the plurality of objects and a horizontal line so that the plurality of objects overlap the corresponding objects in the reference document; the displacement treatment uses the end point coordinates of the plurality of objects and the corresponding objects in the reference document to obtain horizontal and vertical displacement quantities of the digitized document and compensates the displacement so that the plurality of objects overlap the corresponding objects in the reference document; the scaling treatment keeps the ratio of the distance between any two straight lines of the edges of the plurality of objects to the length of one of the two straight lines, or the ratio of the projection length of one straight line on another straight line to the length of one of the two straight lines unchanged and scales accordingly so that the plurality of objects overlap the corresponding objects in the reference document.

23. The computer readable recording medium as described in claim 19, wherein dynamic programming algorithm is used to find the corresponding objects in the reference document.

24. The computer readable recording medium as described in claim 19, wherein the comparing and determining step compares the digitized document with the reference document stored in the database and determines the digitized document to be of the same classification as the reference document when the sum of the distances between all of the objects of the digitized document and the nearest objects thereto in the reference document is the smallest.

25. The computer readable recording medium as described in claim 19, wherein the object is a straight line, and the positioning-information capturing step performs a thinning process of image treatment before capturing the positioning information of a plurality of straight lines in the digitized document.

26. The computer readable recording medium as described in claim 25, wherein each of the digitized document and the reference document contains at least one table.

27. The computer readable recording medium as described in claim 19, wherein the digitized document and the reference document contain only texts, and the positioning-information capturing step captures the positioning information of the plurality of objects of the digitized document by viewing one string of continuous words as one object.

* * * * *

UNITED STATES PATENT AND TRADEMARK OFFICE
CERTIFICATE OF CORRECTION

PATENT NO. : 7,602,971 B2  
APPLICATION NO. : 11/295455  
DATED : October 13, 2009  
INVENTOR(S) : Yeh et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 972 days.

Signed and Sealed this

Fifth Day of October, 2010

David J. Kappos  
*Director of the United States Patent and Trademark Office*